United States Patent
Boxwell et al.

(10) Patent No.: US 11,681,732 B2
(45) Date of Patent: Jun. 20, 2023

(54) TUNING QUERY GENERATION PATTERNS

(71) Applicant: International Business Machines Corporation, Armonk, NY (US)

(72) Inventors: Stephen Arthur Boxwell, Worthington, OH (US); Kyle Matthew Brake, Westerville, OH (US); Keith Gregory Frost, Delaware, OH (US); Stanley John Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 17/131,978

(22) Filed: Dec. 23, 2020

(65) Prior Publication Data
US 2022/0197933 A1    Jun. 23, 2022

(51) Int. Cl.
*G06F 16/00*    (2019.01)
*G06F 16/33*    (2019.01)
(Continued)

(52) U.S. Cl.
CPC ........ *G06F 16/3334* (2019.01); *G06F 16/338* (2019.01); *G06F 16/3329* (2019.01); *G06F 16/3344* (2019.01)

(58) Field of Classification Search
CPC ............. G06F 16/3334; G06F 16/3329; G06F 16/3344; G06F 16/338
(Continued)

(56) References Cited

U.S. PATENT DOCUMENTS 7,085,708 B2    8/2006    Manson
7,266,545 B2    9/2007    Bergman
(Continued)

FOREIGN PATENT DOCUMENTS

CN    102708129 A    10/2012
CN    109033386 A    12/2018
(Continued)

OTHER PUBLICATIONS

International Search Report and Written Opinion, International Application No. PCT/CN2021/125994, International Filing Date Oct. 25, 2021.
(Continued)

*Primary Examiner* — Monica M Pyo
(74) *Attorney, Agent, or Firm* — Erika R. DeCosty

(57) ABSTRACT

A computer-implemented method for optimizing search query results is disclosed. The computer-implemented method includes receiving a first natural language query, selecting a plurality of search query patterns based on the first natural language query, assigning a weight to each search query pattern in the plurality of search query patterns, generating one or more weighted keyword queries from each search query pattern based on the weight assigned to each search query pattern and one or more keywords from the first natural language query, evaluating a relevancy of one or more search results returned by each of the one or more weighted keyword queries for the first natural language query, and iteratively altering the weight assigned to a search query pattern until an optimal number of relevant search results are returned from the search query pattern for the first natural language query.

20 Claims, 4 Drawing Sheets

(51) Int. Cl.
    *G06F 16/338*     (2019.01)
    *G06F 16/332*     (2019.01)

(58) Field of Classification Search
    USPC .......................................................... 707/748
    See application file for complete search history.

(56) References Cited

U.S. PATENT DOCUMENTS

| | | | |
|---|---|---|---|
| 7,403,938 B2 * | 7/2008 | Harrison | G06F 16/3334 |
| 7,774,342 B1 * | 8/2010 | Virdy | G06F 16/9537 |
| | | | 707/732 |
| 7,873,624 B2 | 1/2011 | Agichtein | |
| 8,166,025 B1 * | 4/2012 | Virdy | G06F 16/951 |
| | | | 707/730 |
| 8,346,534 B2 | 1/2013 | Csomai | |
| 8,924,197 B2 | 12/2014 | Pragada | |
| 9,378,517 B2 | 6/2016 | Franosch | |
| 10,339,453 B2 | 7/2019 | Balani | |
| 10,452,682 B2 * | 10/2019 | Bendel | G06F 16/2453 |
| 10,482,089 B2 * | 11/2019 | Seacat | G06F 16/248 |
| 2003/0028520 A1 | 2/2003 | Alpha | |
| 2007/0214131 A1 | 9/2007 | Cucerzan | |
| 2012/0005219 A1 | 1/2012 | Apacible | |
| 2015/0193527 A1 * | 7/2015 | Carter | G06F 16/33 |
| | | | 715/753 |
| 2016/0335372 A1 | 11/2016 | Latzina | |
| 2018/0114155 A1 * | 4/2018 | Rana | G06Q 10/067 |
| 2020/0226143 A1 | 7/2020 | Miller | |
| 2020/0341988 A1 | 10/2020 | Peng | |

FOREIGN PATENT DOCUMENTS

| | | |
|---|---|---|
| CN | 111971669 A | 11/2020 |
| WO | 2022134824 A1 | 6/2022 |

OTHER PUBLICATIONS

Hao et al., "Pattern-revising Enhanced Simple Question Answering over Knowledge Bases", Proceedings of the 27th International Conference on Computational Linguistics, pp. 3272-3282, Santa Fe, New Mexico, USA, Aug. 20-26, 2018.

Mendes et al., "Pattern Mining with Natural Language Processing: An exploratory approach", International Workshop on Machine Learning and Data Mining in Pattern Recognition. Springer, Berlin, Heidelberg, 2009, 14 pages.

Ou et al., "Automatic Question Pattern Generation for Ontology-based Question Answering", Proceedings of the Twenty-First International FLAIRS Conference (2008), 6 pages.

Pradel et al., "Natural language query interpretation into SPARQL using patterns", Fourth International Workshop on Consuming Linked Data—COLD 2013, Oct. 2013, Sydney, Australia, pp. 1-12, hal-01143219.

Rico et al., "Sorry, I only speak natural language: a pattern-based, data-driven and guided approach to mapping natural language queries to SPARQL", IESD 2015, 10 pages.

\* cited by examiner

TUNING QUERY GENERATION PATTERNS

BACKGROUND

The present invention relates generally to the field of search queries, and more particularly to tuning search query patterns to optimize search query results.

A search query or web search query is a query based on a specific search word or term used to satisfy an information need. A search query typically consists of the actual word or string of words a user inputs into a search engine in order to retrieve information related to the search query, such as a particular passage, document, or webpage. Typically, search queries are web based, in which a user enters a search query into a web search engine through the use of a user interface of an electronic device such as a computer, hand-held mobile device, or smart device.

A search query pattern (i.e., "search pattern", "query pattern," "string-searching algorithm", or "string-matching algorithm") includes one or more predefined rules for generating one or more keyword queries based on a given search query. For example, a query pattern [weather in X] may represent all queries that include the term "weather" and a term [X] that identifies a geographic location, such as [weather in Paris], [weather in France], and [weather near me].

A keyword query is a particular query formed from a search query pattern and one or more substrings pulled from a user's search query. For example, given the search query 'What is the Capital of France?' and the search query pattern [X of Y], the keyword query [Capital of France] may be formed.

SUMMARY

According to one embodiment of the present invention, a computer-implemented method for optimizing search query results is disclosed. The computer-implemented method includes receiving a first natural language query. The computer-implemented method further includes selecting a plurality of search query patterns based on the first natural language query. The computer-implemented method further includes assigning a weight to each search query pattern in the plurality of search query patterns. The computer-implemented method further includes generating one or more weighted keyword queries from each search query pattern based on the weight assigned to each search query pattern and one or more keywords from the first natural language query. The computer-implemented method further includes evaluating a relevancy of one or more search results returned by each of the one or more weighted keyword queries for the first natural language query. The computer-implemented method further includes iteratively altering the weight assigned to a search query pattern until an optimal number of relevant search results are returned from the search query pattern for the first natural language query.

According to another embodiment of the present invention, a computer program product for optimizing search query results is disclosed. The computer program product includes one or more computer readable storage media and program instructions stored on the one or more computer readable storage media. The program instructions include instructions to receive a first natural language query. The program instructions further include instructions to select a plurality of search query patterns based on the first natural language query. The program instructions further include instructions to assign a weight to each search query pattern in the plurality of search query patterns. The program instructions further include instructions to generate one or more weighted keyword queries from each search query pattern based on the weight assigned to each search query pattern and one or more keywords from the first natural language query. The program instructions further include instructions to evaluate a relevancy of one or more search results returned by each of the one or more weighted keyword queries for the first natural language query. The program instructions further include instructions to iteratively alter the weight assigned to a search query pattern until an optimal number of relevant search results are returned from the search query pattern for the first natural language query.

According to another embodiment of the present invention, a computer system for optimizing search query results is disclosed. The computer system includes one or more computer processors, one or more computer readable storage media, computer program instructions, the computer program instructions being stored on the one or more computer readable storage media for execution by the one or more computer processors. The program instructions include instructions to receive a first natural language query. The program instructions further include instructions to select a plurality of search query patterns based on the first natural language query. The program instructions further include instructions to assign a weight to each search query pattern in the plurality of search query patterns. The program instructions further include instructions to generate one or more weighted keyword queries from each search query pattern based on the weight assigned to each search query pattern and one or more keywords from the first natural language query. The program instructions further include instructions to evaluate a relevancy of one or more search results returned by each of the one or more weighted keyword queries for the first natural language query. The program instructions further include instructions to iteratively alter the weight assigned to a search query pattern until an optimal number of relevant search results are returned from the search query pattern for the first natural language query.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
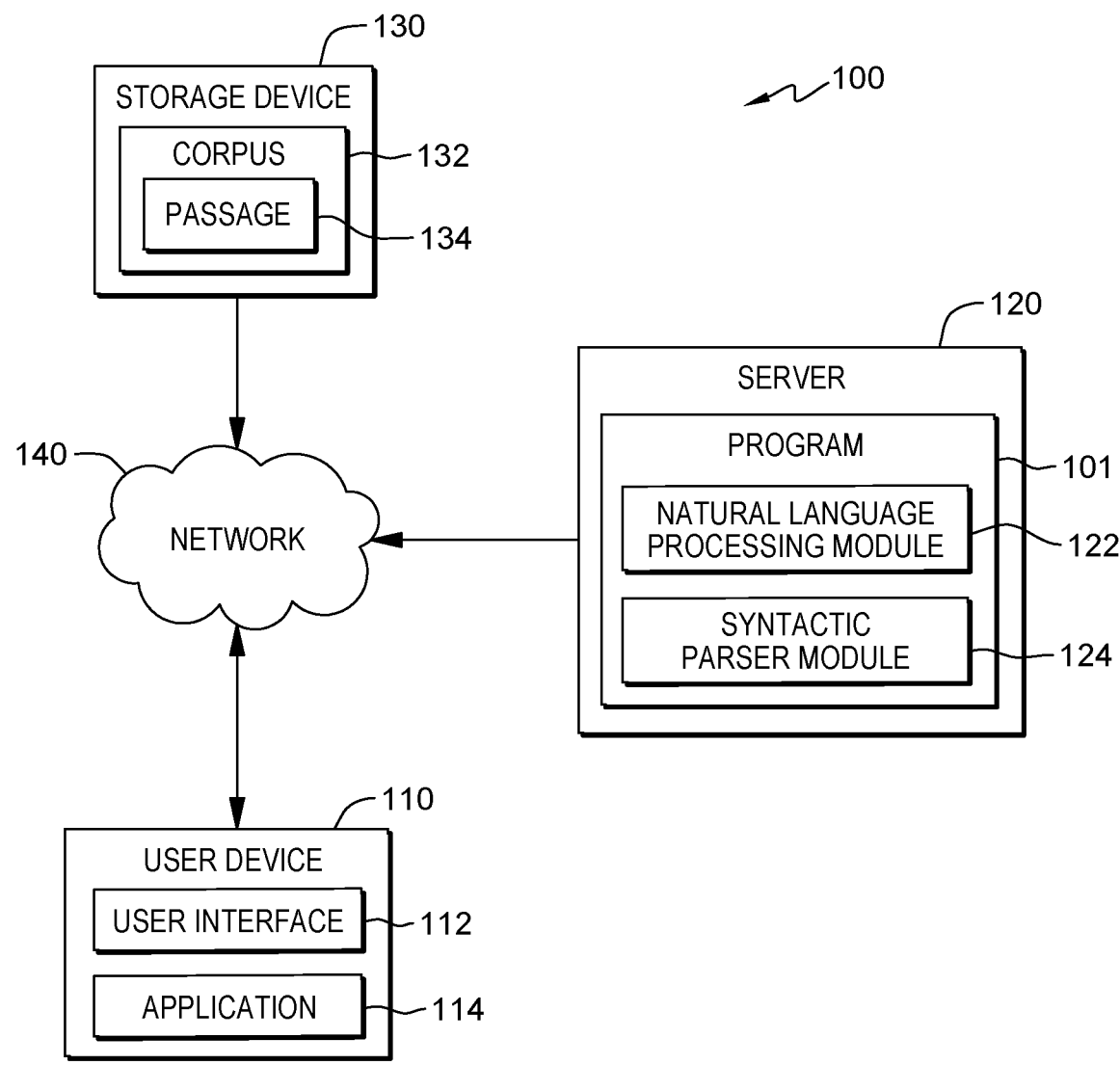
FIG. 1 is a functional block diagram of a computing system, generally designated 100, for information retrieval in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of search queries, and more particularly to tuning search query patterns to optimize search query results.

When using an information retrieval system, such as a web search engine, individuals vary greatly in how they construct queries and the information an individual expects to retrieve based on a particular search query. Oftentimes, users seeking similar information input different search queries. Some users may prefer short questions, whereas others may prefer to be more verbose. Similarly, some users may include a particular word (e.g., find) with the expectation that the information retrieval system will take into account the word in all cases (e.g., find, finds, finding), whereas others phrase things more flexibly (e.g., find [ ]). However, the use of different words, order, and combination of words in a search query can produce different results. Oftentimes a user needs to alter their search query multiple times in order to receive the correct result they are looking for. However, embodiments of the present invention recognize that an individual may still be unable to find their desired search result even after altering their search query multiple times themselves. Additionally, embodiments of the present recognize that requiring an individual to take the time to continuously alter and refine a search query to find their desired result can be burdensome and time consuming.

Embodiments of the present invention improve upon the foregoing deficiencies by automatically tuning search query patterns for a particular user to optimize the expected results thereof. According to embodiments of the present invention, multiple keywords queries are generated from two or more search query patterns for a given search query. In an embodiment, each of the two or more search query patterns are given an initial weight, in which each subsequent keyword query generated from respective search query pattern is assigned a weight corresponding to the weight given to the search query pattern. The relevancy of the results returned by each keyword query are analyzed. The accuracy or relevancy of each result returned via a respective keyword query is then evaluated. In an embodiment, an iterative hill-climbing algorithm is used to arbitrarily choose a neighboring state (e.g., by incrementing the weight of one of the selected search query patterns one by one). The new state is evaluated by, for a given search query, constructing a keyword query from a respective search query, searching a corpus of documents and evaluating a score for the given search query. In an embodiment, the weights are adjusted in real-time as passages are evaluated by the hill-climbing algorithm until an optimal number of search results is achieved for a given search query. The weighted values assigned to the respective keyword queries that achieved the optimal number of search results is saved for use with subsequent similar keyword queries. In doing so, the system of the present invention may automatically assign predetermined weights to similar future generated keyword queries, thereby optimizing the results returned for a particular individual.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a computing system, generally designated 100, for information retrieval in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes user device 110, server 120, and storage device 130 interconnected over network 140. User device 120 may represent a computing device of a user, such as a laptop computer, a tablet computer, a netbook computer, a personal computer, a desktop computer, a personal digital assistant (PDA), a smart phone, a wearable devices (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 120 may include components, as depicted and described in further detail with respect to FIG. 3, in accordance with embodiments of the present invention.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In various example embodiments, application 114 can be an application that a user of user device 110 utilizes to input a search query and view search results via user interface 112. In other embodiments, application 114 can be another mobile device application (e.g., a web browser, enterprise-specific messaging application, social media application, etc.). For example, application 114 is a client-side application associated with server 120 (e.g., a client-side application associated with search query program 101).

In an additional embodiment, application 114 can operate to perform processing steps of search query program 101

(i.e., application 114 can be representative of search query program 101 operating on user device 110), in accordance with various embodiments of the present invention. For example, a user of user device 110 can input a natural language query utilizing application 114 and view the results on user device 110 (e.g., via user interface 112). In some embodiments, a pop-up window appears on application 114 via user interface 112 requesting the user to indicate whether or not search results displayed are relevant or not. In an embodiment, feedback data collected from the user is used to improve upon or "fine tune" the search query patterns used to construct keyword queries for future queries. In an embodiment, feedback data collected can be used further used as training, e.g., via machine learning, as to whether or not weights assigned to a particular search query pattern should be increased or increased. Similarly, feedback data can be used to learn whether particular search queries patterns, and the weights assigned thereto, should automatically be selected for use with similar future queries.

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by components of computing environment 100 (e.g., user device 110, storage system 130, and other devices not shown). In general, server 120 is representative of any electronic device or combination of electronic devices capable of executing computer readable program instructions. Server 120 may include components as depicted and described in further detail with respect to FIG. 3, in accordance with embodiments of the present invention.

Server 120 includes search query program 101, which further includes, natural language processing module 122 and syntactic parser module 124. In an embodiment, natural language processing (NPL) module 122 is a component or sub-program of search query program 101 used to analyze input search queries. Natural language processing is a sub-field of linguistics, computer science, and artificial intelligence for processing natural language data. In various embodiments, natural language processing module 122 separates input search queries into words, for example, through the use of word segmentation or tokenization. Word segmentation is the separation of continuous text into words. For example, the input search query received from the user contains a plurality of words and is separated into individual words. Tokenization is the process of breaking up and classifying sections of a string of input characters. For example, the individual words are broken up into keywords, phrases, tokens, or substrings. For example, the query "what is the capital city of Spain?" may be broken up into the following substrings or tokens: [what], [is], [the], [capital], [city], [of], and [Spain]. In an embodiment, stop words are removed according to the search query pattern. Stop words (e.g., a, an, the, etc.) are common words used in a language that do not provide additional information that assists in identifying search results (i.e., words that do not influence the results). For example, the search query "what is the capital city of Spain?" includes stop words ["is"], ["the"], and ["of"]. Once the stop words are removed, only the following substrings or tokens may be used when matching the query to a query pattern: ["capital"], ["city"], and ["Spain"].

In an embodiment, natural language processing module 122 performs part-of-speech tagging on the tokens or substrings. Part-of-speech tagging (i.e., grammatical tagging) is the process of marking up a word in a text as corresponding to a particular part of speech, based on both its definition and its context. For example, natural language processing module 122 can tag individual words as a noun, verb, adjective, etc. based on the definition of the words and the context in which the words are used in the input search query. In an embodiment, only words having predetermined parts of speech are used when generating keyword queries constructed from search query patterns. As an example, given a Regular Expression having the pattern [verb]+[adjective]+[noun] the query "who ran the fastest at the Olympics?" may produce of the following keyword query: ["ran"] (verb) ["fastest"] (adjective), and "[Olympics]" (noun).

In an embodiment, syntactic parser module 124 is a component or sub-program of search query program 101 used to analyze input search queries. Syntactic parsing (i.e., syntax analysis or parsing) is the process of analyzing natural language with the rules of a formal grammar. Here, grammatical rules are applied to categories and group of words rather than individual words. For example, the query 'Why did the chicken cross the road?' includes a subject and a predicate where the subject (the chicken) is a noun phrase and the predicate (cross the road) is a verb phrase.

Server 120 utilizes storage device 130 to store and retrieve various information, such as corpus 132 and passage 134. Storage device 130 can be implemented with any type of storage device which is capable of storing data that may be accessed and utilized by server 120 and user device 110, such as a database server, a hard disk drive, or a flash memory. In an embodiment, storage device 130 can represent multiple storage devices and collections of data within server 120.

Corpus 132 is a set of documents or structured information. A corpus, as used herein, may generally be understood as a number of electronic passages, where each passage is uniquely identifiable. For example, corpus 132 can be a file or set of files, webpage or set of webpages, database, or any type of structured data stored in storage device 130. In some embodiments, search query program 101 matches keyword queries to corpus 132 to return one or more search results from corpus 132. In other embodiments, search query program 101 matches keyword queries to web-based data to return one or more search results (e.g., uniform resource locators (URLs) or information included in a webpage) via an Internet enabled platform such as a web-search engine.

Passage 134 is a portion or section of a written work or piece of data. In some embodiments, search query program 101 breaks up a document by the process of pagination (i.e., electronic pagination or "electronic paging"). Pagination is the process of dividing or splitting the contents of an electronic dataset, such as a word document or website, into discrete electronic pages. Pagination is oftentimes used in databases and web applications to allow direct access to divided contents across a number of different pages. For example, pagination can be used to display a limited number of results on a search engine results page or show a limited number of posts when viewing a forum thread. Access to divided contents is provided in the form of a user interface pattern (i.e., "pagination pattern") or "pagination design pattern"), which is to say a set of machine logic rules that specify how the contents are divided up (e.g., first 5,000 words on first page, second 5,000 words on second page, ... residual, leftover words on last page or a document is broken up by every ten pages, meaning a 24-page document will be broken up into two ten-page sections and one four-page section). These machine logic rules dictate how the contents are divided into separate pages.

According to various embodiments of the present invention, search query program 101 selects and tailors search query patterns, and thereby the keywords queries constructed from the search queries, based on the context and/or syntactic/semantic structure of the queries themselves. In an embodiment, particular search query patterns are selected, and weights assigned thereto, for constructing keyword queries for a new query based on comparing at least one of a context and/or syntactic/semantic structure of the new query to that of previous queries. The weighted values assigned to the particular search query patterns that achieved the optimal number of search results (a highest number of results that correctly answer a query) for past similar queries during a training phase are automatically selected for retrieving results for similar future generated queries. In doing so, the top listed search results returned for a query are likely to be most relevant to answering the query the first time around without requiring the user to alter their search query itself in order to obtain the most likely information the user is looking for.

In an initial training phase, a query is received, and a predetermined number of search query patterns are selected. In an embodiment, the search query patterns may take the form of a regular expression. A regular expression (i.e., "regex" or "regexp") is a sequence of characters that define a search pattern. In an embodiment, the search query patterns may take the form of a syntactic graph matching component. Semantic graph matching allows for the analysis of the associative and contextual nature of queries. Semantic matching includes the retrieval of both explicitly and implicitly derived information based on syntactic, semantic, and structural information within the query. However, it should be appreciated that the search query patterns used for training or otherwise finetuning search query patterns may include any known types and combination of known types of search query patterns. In an embodiment, search query program 101 stores and retrieves search query patterns from storage device 130.

In an embodiment, a search query pattern includes at least one or more of the following:
(1) A pattern (P), capable of:
   a. Recognizing a particular substring (A) of a query, and
   b. Identifying particular substrings (B) within (A);
(2) One or more formatting strings representing a search token and zero or more slots into which the particular substrings (B) should be placed;
(3) A list of substring labels for (B), indicating the order in which the particular substrings (B) should be arranged; and
(4) A weight, in the form of a non-negative real number.

In an embodiment, the search query pattern (P) takes on the form of a regular expression, and particular substrings (A) and (B) are identified using named capturing groups. In an embodiment, the search query pattern (P) takes on the form of a syntactic graph matching component, where syntactic/semantic relations or dependencies are used to identify the particular substring (A), and the particular substrings (B) within (A) are identified by syntactic tokens within the overall search query pattern (P).

In an embodiment, search query program 101 assigns a relative score multiplier (i.e., "boost" or "weight") to each search query pattern selected for a particular query. A relative score multiplier influences the relevancy ranking of the search results. For example, a relative score multiplier ranking of two will be twice as influential as a relative score multiplier ranking of one.

In an embodiment, search query program 101 constructs keyword queries from search query patterns. For example, tokens derived from a query are matched to a search query pattern. In an embodiment, a relative score multiplier assigned to a particular search query pattern is also assigned to each keyword query generated by the search query pattern. For example, assume the search query pattern '(?<=(|^))(?<field1>\\w+)(?=(|\\??$))' is selected for the query "What is the capital of France?", wherein (?<=(|^)) means "to the left of this token, there should be a space or the start of the string," (?<field1>\\w+) means "the token itself is made up of one or more letters associated field1 (not spaces or punctuation), and (?=(|\\??$)) means "to the right of the token, there should either be a space or there should be a question mark." Based on this search query pattern, the following two keyword queries may be generated: [capital] [France]. Thus, is a relative score multiplier of [2.0] is assigned to this search query pattern, then a relative score multiplier of [2.0] may also be assigned to each keyword query as follows: [capital^2.0] [France^2.0].

In an embodiment, one or more passages 134 are retrieved from corpus 132 for each query. The relevancy of the one or more passages 134 returned from each weighted search query pattern, and thereby the weighted keyword queries constructed from each weighted search query pattern, is analyzed and evaluated. In an embodiment, the evaluation step may use a simple count how many of the passages correctly answer the question. In an embodiment, the evaluation step uses the sum of the scores of each passage, where the score for each passage is 1/n if the passage correctly answers the question (where n is the rank of the passage) and 0 otherwise. However, it should be appreciated that any known types of scoring may be used.

In an embodiment, an answer key is provided, in addition to corpus 132, consisting of a number of queries, where each query includes: (i) a natural language questions, (ii) a list of passages that correctly answer the question (not including passages that happen to merely contain the answer string in a context that does not correctly answer the question), and (iii) a list of passages that do not correctly answer the question. In an embodiment, corpus 132 is annotated such that, for each question, each passage is labeled as "correctly answering the question" or "not correctly answer the question." In an embodiment, all passages that correctly answer the question are annotated as such, and all other passages that are not annotated are assumed to not correctly answer the question. In an embodiment, judgements are made in real-time by subject matter experts as passages are evaluated as to whether a passage correctly answers a question. These judgements may be saved in likely event that passages are retrieved more than once when faced with keyword queries that are similar to each other.

In an embodiment, a hill-climbing algorithm alters the relative score multiplier of one or more of the search query patterns. Hill-climbing algorithms attempt to find a better solution to a problem by making incremental changes to the solution. In an embodiment, search query program 101 continuously adjusts the relative score multiplier for one or more search query patterns in order to obtain the optimum number of relevant search results for one or more queries. In an embodiment, an initial relative score multiplier of 1.0 is assigned to each search query pattern and may be adjusted up or down based on the relevancy of those passages returned.

In an exemplary embodiment, suppose that search query patterns are in the form of regular expressions, and that the evaluation metric for the search query patterns shall consist of a simple count of how many search results are relevant. In other words, the evaluation metric for the search query patterns is based on how many relevant search results are returned for a given keyword query constructed from a particular search query pattern. For the purposes of this exemplary embodiment, the following three search query patterns (represented in JSON format) are provided:

SQP Pattern #1:
"pattern":"(?<=(|^))(?<field1>\\w+)(?=(|\\??$))",
"formattingString":["%s"],
"fields":["field"],
"weight":1

SQP Pattern #2:
"pattern":"(?<=(|^))(?<field1>\\w+) of (?<field2>\\w+) (?=(↑\\??$))",
"formattingString":["%s of %s"],
"fields": ["field1","field2"],
"weight":1

SQP Pattern #3:
"pattern":"(?<=(|^))(?<field1>\\w+) of (?<field2>\\w+) (?=(|\\??$))",
"formattingString":["%s %s"],
"fields":["field2","field1"],
"weight":1

Continuing with this exemplary embodiment, assume that there are two queries: (i) 'What is the capital of France?' and 'Which is the capital city of Spain?'. Based on the above listed three SQPs, the following keyword queries (after removing any stop words) may be generated for the first query—'What is the capital of France?':

SQP #1: [capital^1.0] [France^1.0]
SQP #2: [capital of France^1.0]
SQP #3: [France capital^1.0]

According to the above listed keyword queries, the following passages 134 may be returned from corpus 132:
(1) "Paris is the capital of France. It has many fine museums and a lot of history."
(2) "Capital punishment in France was banned in 2007."
(3) "France is a capital place to visit if you like museums and gigantic radio towers."

Based on an answer key, it may be determined that the first passage is relevant to the query, but the second and third passages are not.

Similarly, based on the above listed three SQPs, the following keyword queries (after removing any stop words) may be generated for the first query—'Which is the capital city of Spain?':

SQP #1: [capital^1.0] [city^1.0] [Spain^1.0]
SQP #2: [city of Spain^1.0]
SQP #3: [Spain city^1.0]

According to the above listed keyword queries, the following passages 134 may be returned from corpus 132:
(1) "The president took the time to visit Madrid, the capital city of Spain."
(2) "The 1978 Spanish Constitution bans capital punishment in Spain."
(3) "Madrid is the capital and largest city in Spain."

Based on the answer key, it may be determined that the first and third passages are relevant to the query, but the second passage is not. Of the six passages returned by the keyword queries generated by the three SQPs, only three are relevant, and thus, a score of 3 may be assigned to each SQP pattern.

Continuing further with this exemplary embodiment, a hill-climbing algorithm chooses a new set of weights for the three SQPs. For example, suppose that a new set of weights are assigned to each of the three SQPs as follows: SQP #1 [1.0], SQP #2 [2.0], and SQP #3 [1.0]. Here, the weight or boost of SQP #2 has been increased from [1.0] to [2.0], signifying that results returned from the corresponding keyword query ([capital of France^2.0]) will be twice as influential.

Based on the new weights assigned to the three SQPs, the following keyword queries (after removing any stop words) may again be generated for the first query—'What is the capital of France?':

SQP #1: [capital^1.0] [France^1.0]
SQP #2: [capital of France^2.0]
SQP #3: [France capital^1.0]

According to the above listed keyword queries, the following passages 134 may be returned from corpus 132:
(1) "The Paris Agreement is an agreement signed in the capital of France in 2016. The capital of France was chosen to host because the capital of France has many conveniently located restaurants."
(2) "Paris is the capital of France. It has many fine museums and a lot of history."
(3) "Paris, the capital of France, has hosted many conferences and ceremonies."

Based on the answer key, it may be determined that all three passages are relevant to the query (and are more likely to contain the exact phrase "capital of France" than the previous search results returned using the first set of weights assigned to the SQPs).

Similarly, based on the new weights assigned to the three SQPs, the following keyword queries (after removing any stop words) may again be generated for the second query—'Which is the capital city of Spain?':

SQP #1: [capital^1.0] [city^1.0] [Spain^1.0]
SQP #2: [city of Spain^2.0]

According to the above listed keyword queries, the following passages 134 may be returned from corpus 132:
(1) "The capital of Spain was Toledo until 1561, when the capital city of Spain was changed."
(2) "The president took the time to visit Madrid, the capital city of Spain."
(3) "Madrid is the capital and largest city in Spain."

Based on the answer key, it may be determined that the second and third passages are relevant to the query, but the first passage is not. Of the six passages returned by the keyword queries generated by the three SQPs, five are relevant, and thus, a score of 5 may be assigned to each SQP pattern based on the newly assigned weights [1.0] [2.0] [1.0]. Since this is an improvement on the previous score of 3 based on the originally assigned weights [1.0] [1.0] [1.0], the process may continue and the hill climbing algorithm may increase the weight assigned to the second SQP until an optimum number (e.g., all passages correctly answer the question or the number of passages that correctly answer the question has ceased to increase responsive to an increase in weight) of relevant passages 134 are returned.

In an embodiment, search query program 101 applies predetermined weighted search query patterns to new search queries. In an embodiment, a predetermined weighted search query pattern is based on a prior determination of an optimal weighted search query pattern used for a previous similar that matches or is most similar to a new search query.

In an embodiment, search query program 101 generates a predetermined weighted search query pattern used for a previous search query to a new search query pattern if it is determined that there is a match between a previous search query and the new search query. In an embodiment, two search queries can match based, at least in part, on one or more of, but not limited to, their semantic structure, syntactic structure, sentence structure, and context.

In an embodiment, search query program 101 generates a predetermined weighted search query pattern used for a previous search query to a new search query pattern based on identifying a previous search query having a highest degree of similarity with the new search query and/or a degree of similarly above a predetermined threshold with the new search query. In an embodiment, a degree of similarly between two search queries is based, at least in part, on one or more of, but not limited to, their semantic structure, syntactic structure, sentence structure, and context.

In an embodiment, if search query program 101 determines a previous search query and a new search query pertain to the same topic, search query program 101 generates a predetermined weighted search query pattern for the new search query based on an optimal weighted search query pattern previously determined for the previous search query.

For example, the previous weighted search query patterns determined for the previous input search query of "What is the weather in Miami?" may later be assigned to a new search query input of "What is the weather in Boston?" In this example, search query program 101 may detect that the previous search query and the new search query are both about weather and a location. Continuing with this example, assume that it was determined for the first search query of "What is the weather in Miami?" that the following weighted search query patterns received optimum search results:

SQP #1: [weather^1.0] [Miami^1.0]
SQP #2: [weather in Miami^2.0]

Based on the previously determined optimal weighted search query patterns for the search query "What is the weather in Miami?", search query program 101 further generates the same weighted search query patterns for the new search query of "What is the weather in Boston?" as follows:

SQP #1: [weather^1.0] [Boston^1.0]
SQP #2: [weather in Boston^2.0]

Figure 2:
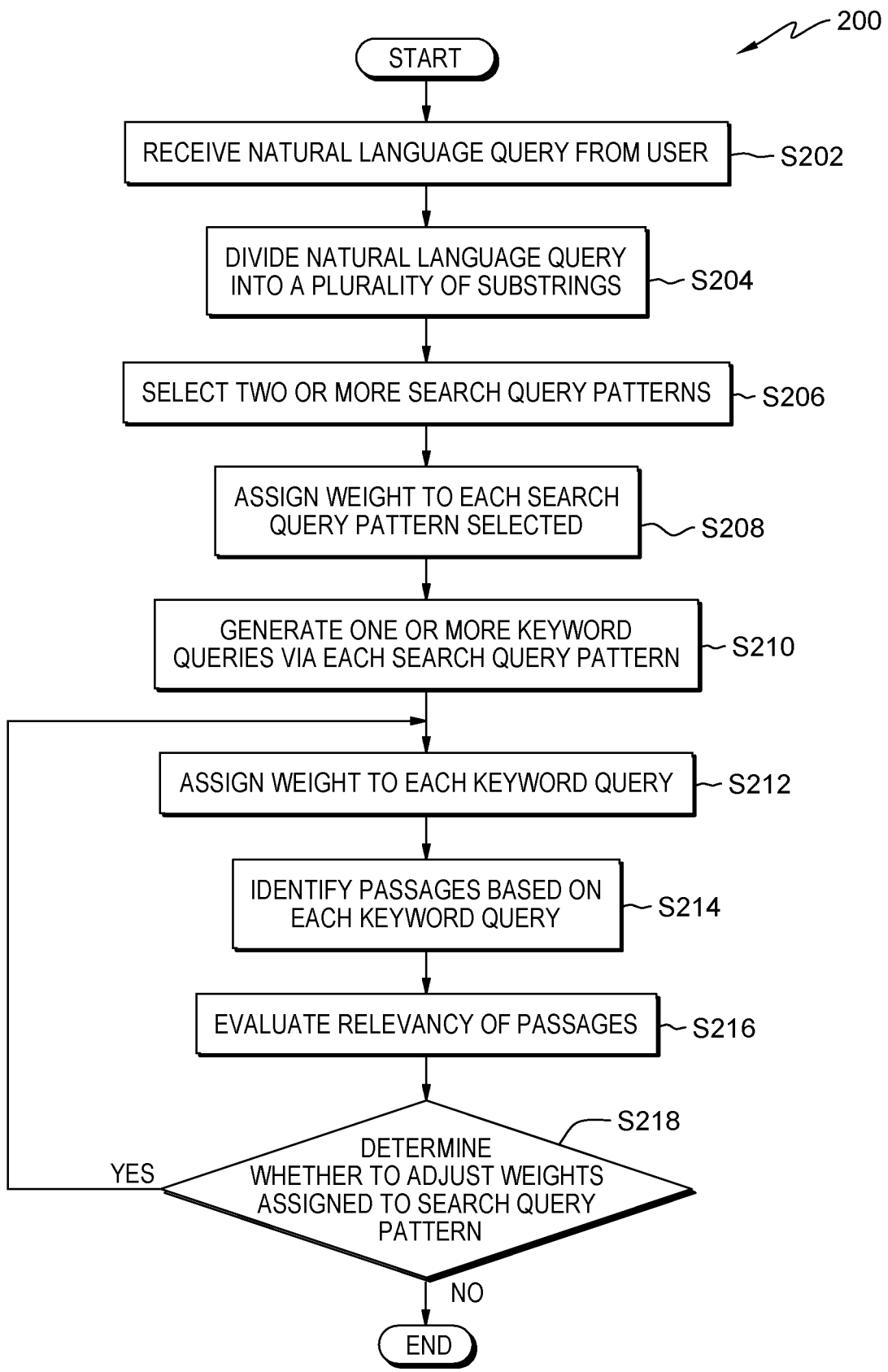
FIG. 2 is a flow chart diagram depicting operational steps for tuning search query generation patterns in accordance with at least one embodiment of the present invention.

FIG. 2 is a flow chart diagram, generally designated 200, depicting operational steps for optimizing search query patterns on a user device in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, search query program 101 receives one or more queries. For example, the one or more queries is posed in the form of a natural language question. In another example, the one or more queries is posed in the form of a multiword passage. However, it should be appreciated that search query program 101 may receive and process any types of queries generally known by one of ordinary skill in the art.

At step S204, search query program 101 divides the query into a plurality of substrings or tokens. In an embodiment, search query program 101 removes stop words, such as "a", "an", "the", and the like. In an embodiment, search query program 101 identifies particular substrings or tokens of interest, e.g., via named capturing groups.

At step S206, search query program 101 selects two or more search query patterns. In an embodiment, the two or more search query patterns are selected based on the one or more queries themselves. For example, search query program 101 selects a search query pattern based, at least in part, on one or more of the context, the syntactic and/or semantic structure of a query, and the similarity of a new query to past queries used for training purposes. In an embodiment, search query program 101 selects any variation or combination of two or more search query patterns at random.

At step S208, search query program 101 assigns a weight to each search query pattern selected in step S206. In an embodiment, the weights are relative score multipliers comprised of nonnegative real numbers.

At step S210, search query program 101 constructs one or more keyword queries from each search query pattern selected in step S206.

At step S212, search query program 101 assigns a weight to each keyword query constructed in step S210. In an embodiment, an initial weight assigned to each search query pattern is also assigned to a corresponding keyword query generated from a respective search query pattern. For example, if an initial weight of [1.0] is assigned to a selected search query pattern selected in step S208, then a weight of [1.0] is similarly assigned to any keyword queries constructed from the selected search query pattern having a weight of [1.0].

At step S214 search query program 101 identifies passages based on each keyword query. At step S216 search query program 101 evaluates the relevancy of the passages returned based on each keyword query.

At decision step S218, search query program 101 determines whether to adjust the weights assigned to each search query pattern. If it is determined that the weights assigned to a search query pattern need to be adjusted (decision step S218 "YES" branch), search query program 101 proceeds to step S212. If it is determined that the weights assigned to a search query pattern do not need to be adjusted (decision step S218 "NO" branch), the process ends and search query program 101 terminates.

Figure 3:
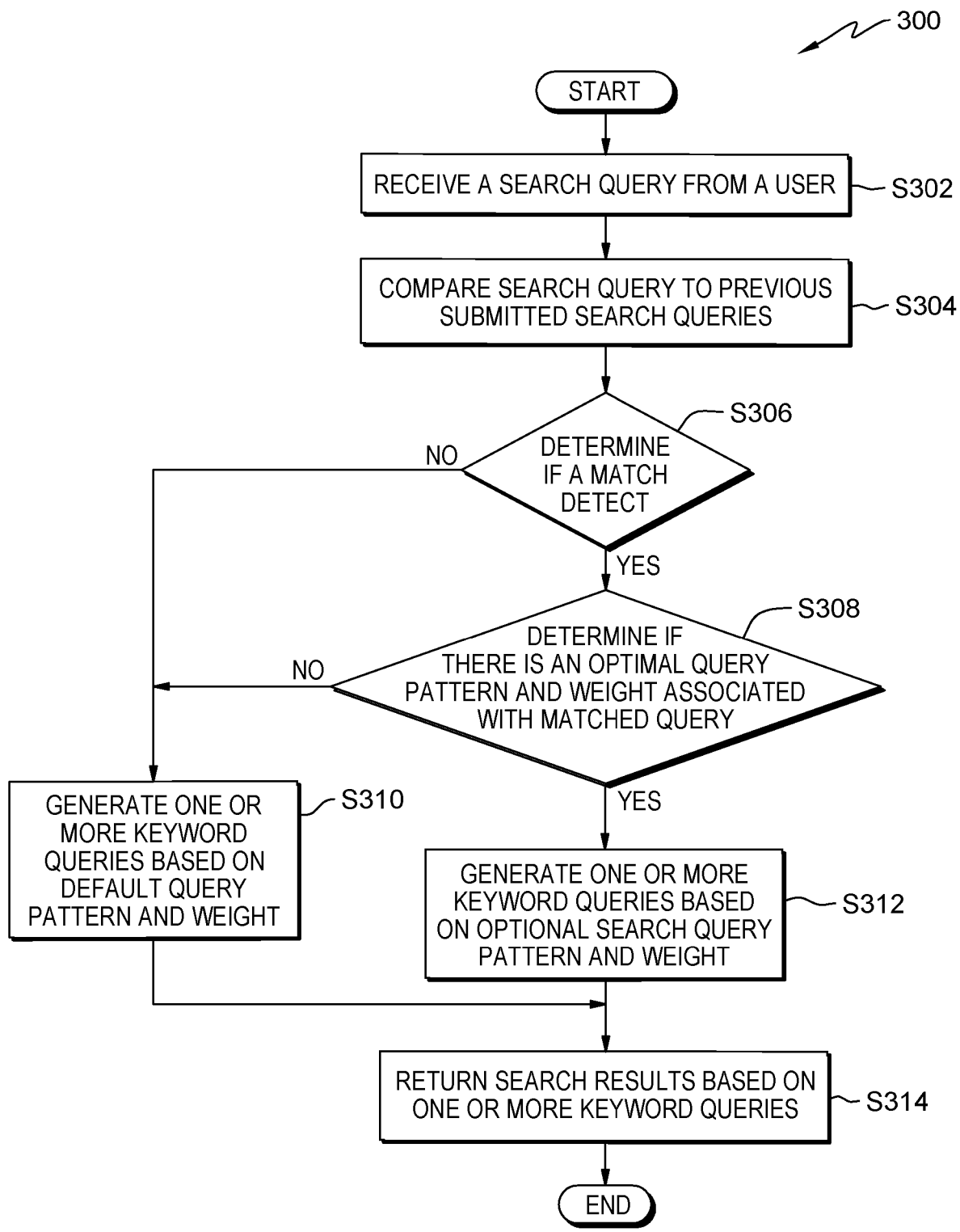
FIG. 3 is a flow chart diagram depicting operational steps for generating and assigning predetermined search query patterns and weights for particular search queries in accordance with at least one embodiment of the present invention.

FIG. 3 is a flow chart diagram, generally designated 300, depicting operational steps for generating and assigning predetermined weighted search query patterns for particular search queries in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, search query program 101 receives a search query from a user. At step S304, search query program 101 compares the search query to previous submitted search queries.

At decision step S306, search query program 101 determines if a match is detected between the search query received from the user and a previously submitted search query. It should be appreciated that a comparison of two search queries need not have been submitted by the same individual. Rather, a new search query submitted by one individual may be compared to a previously search query submitted by a different individual. In an embodiment, search query program 101 detects a match if the search query is identical to a past search query. In an embodiment, search query program 101 detects a match based on identifying a highest degree of similarity or a degree of similarly above a predetermined threshold between two search queries. In an embodiment, if multiple matches are detected, search query program 101 can compare the search query pattern matches. In an embodiment, scores are assigned for each comparison and the search query having the highest score relative to the new query is selected as a match. If it is determined that a match is detected (decision step S306 "YES" branch), search query program 101 proceeds to decision step S308. If it is determined a match is not detected (decision step S306 "NO" branch), search query program 101 proceeds to step S310.

At decision step S308, search query program 101 determines if there is an optimal weighted query pattern associated with matched search query. In an embodiment, an optimal weighted query pattern is a pattern determined to retrieve the highest number of relevant results for a particular search query. In an embodiment, an optimal weighted query pattern is a weighted query pattern determined to retrieve the most relevant search results which correctly answer a particular search query. If it is determined that there is not an optimal weighted query pattern associated with matched query (decision step S308 "NO" branch), search query program 101 proceeds to step S310. If it is determined that there is an optimal weighted query pattern associated with the matched query (decision step S308 "YES" branch), search query program 101 proceeds to step S312.

At step S310, search query program 101 generates one or more weighted keyword queries based on a default weighted query pattern. For example, a default weight of [1.0] is assigned to each keyword query generated from the default query pattern.

At step S312, search query program 101 generates one or more keyword queries based on an optimal weighted search query pattern.

At step S314, search query program 101 returns search results based on the one or more weighted keyword queries generated at either step S310 or S312.

Figure 4:
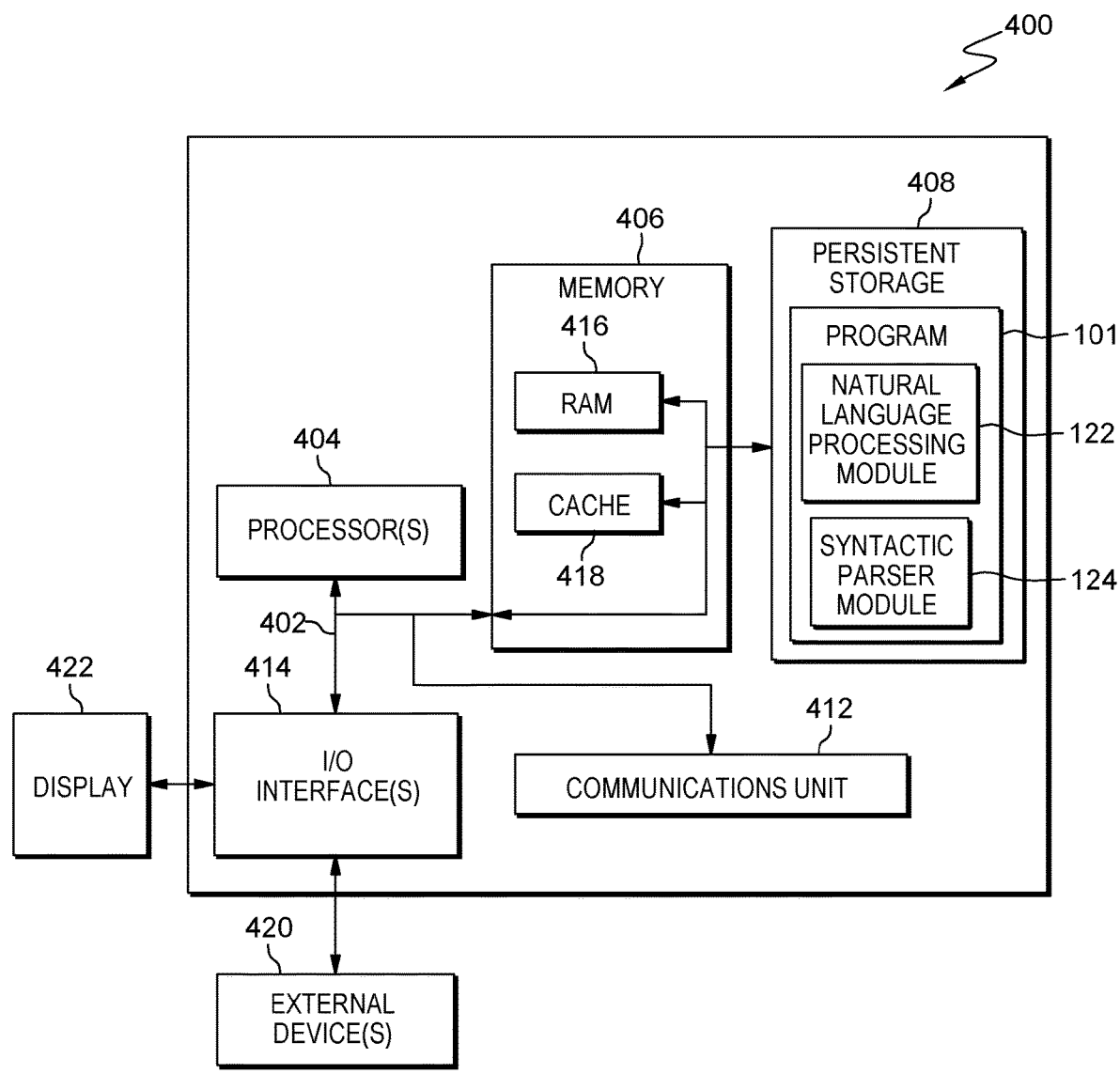
FIG. 4 is a block diagram depicting components of a computer, generally designated 300, suitable for executing a search query program 101 in accordance with at least one embodiment of the present invention.

FIG. 4 is a block diagram depicting components of a computing device, generally designated 400, suitable for executing search query program 101 in accordance with at least one embodiment of the invention. Computing device 400 includes one or more processor(s) 404 (including one or more computer processors), communications fabric 402, memory 406 including, RAM 416 and cache 418, persistent storage 408, which further includes search query program 101, including natural language processing module 122 and syntactic parser module 124, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile one or more computer readable storage media.

Program instructions for search query program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

What is claimed is:

1. A computer-implemented method for optimizing search query results, comprising:
receiving a first natural language query;
selecting a plurality of search query patterns based on the first natural language query;
assigning a weight to each search query pattern in the plurality of search query patterns;
generating one or more first weighted keyword queries from each search query pattern based on the weight assigned to each search query pattern and one or more keywords from the first natural language query;
evaluating a relevancy of one or more search results returned by each of the one or more first weighted keyword queries for the first natural language query, wherein evaluating the relevancy of one or more search results comprises matching each of the one or more first keyword queries to a corpus of passages, wherein each passage in the corpus of passages is labeled as either correctly answering or not correctly answering a question from the first natural language query, and further wherein evaluating the relevancy of one or more search results comprises scoring each passage in the corpus of passages labeled as correctly answering the question from the first natural language query and summing the scores of each of the one or more passages labeled as correctly answering the question from the first natural language query; and iteratively altering the weight assigned to a search query pattern in the plurality of search query patterns, based, at least in part on the summing of the scores of each of the one or more passages labeled as correctly answering the question from the first natural language query, until an optimal number of relevant search results are returned from the search query pattern for the first natural language query.

2. The computer-implemented method of claim 1, further comprising:
receiving a second natural language query;
comparing the second natural language query to the first natural language query; and
determining that the second natural language query matches the first natural language query.

3. The computer-implemented method of claim 2, further comprising, responsive to determining that the second natural language query matches the first natural language query:
determining that an optimal weighted search query pattern is associated with the first natural language query;
generating one or more second weighted keyword queries for the second natural language query based on the optimal weighted search query pattern associated with the first natural language query and one or more keywords from the second natural language query; and
returning one or more search results from the one or more second weighted keyword queries for the second natural language query.

4. The computer-implemented method of claim 2, further comprising, responsive to determining that the second natural language query does not match the first natural language query;
generating one or more default weighted keyword queries for the second natural language query based a default weight assigned to a default search query pattern and one or more keywords from the second natural language query.

5. The computer implemented method of claim 2, wherein the match between the second natural language query and the first natural language query is based on one or more of: (i) a shared semantic structure, (ii) a shared syntactic structure, (iii) a shared sentence structure, and (iv) a shared context.

6. The computer-implemented method of claim 3, wherein the optimal weighted search query pattern is a weighted search query pattern determined to retrieve a highest number of relevant search results for a particular natural language search query.

7. The computer-implemented method of claim 3, wherein the optimal weighted search query pattern is a weighted search query pattern determined to correctly answer a particular natural language query.

8. A computer program product for optimizing search query results, the computer program product comprising a computer readable storage medium and program instructions stored on the computer readable storage medium, the program instructions including instructions to:
receive a first natural language query;
select a plurality of search query patterns based on the first natural language query;
assign a weight to each search query pattern in the plurality of search query patterns;
generate one or more first weighted keyword queries from each search query pattern based on the weight assigned to each search query pattern and one or more keywords from the first natural language query;
evaluate a relevancy of one or more search results returned by each of the one or more first weighted keyword queries for the first natural language query, wherein the instructions to evaluate the relevancy of one or more search results comprises matching each of the one or more first keyword queries to a corpus of passages, wherein each passage in the corpus of passages is labeled as either correctly answering or not correctly answering a question from the first natural language query, and further wherein the instructions to evaluate the relevancy of one or more search results comprises scoring each passage in the corpus of passages labeled as correctly answering the question from the first natural language query and summing the scores of each of the one or more passages labeled as correctly answering the question from the first natural language query; and
iteratively alter the weight assigned to a search query pattern in the plurality of search query patterns, based, at least in part on the summing of the scores of each of the one or more passages labeled as correctly answering the question from the first natural language query, until an optimal number of relevant search results are returned from the search query pattern for the first natural language query.

9. The computer program product of claim 8, further comprising instructions to:
receive a second natural language query;
compare the second natural language query previously submitted to the first language query; and
determine that the second natural language query matches the first natural language query.

10. The computer program product of claim 9, further comprising instructions to, responsive to determining that the second natural language query matches a first natural language query:
determine that the optimal weighted search query pattern is associated with the first natural language query;
generate one or more second weighted keyword queries for the second natural language query based on the optimal weighted search query pattern associated with the first natural language query and one or more keywords from the second natural language query; and
return one or more search results from the one or more second weighted keyword queries for the second natural language query.

11. The computer program product of claim 9, further comprising instructions to, responsive to determining that the second natural language query does not match the first natural language query;
generate one or more default weighted keyword queries for the second natural language query based a default weight assigned to a default search query pattern and one or more keywords from the second natural language query.

12. The computer program product of claim 9, wherein the match between the second natural language query and the first natural language query is based on one or more of: (i) a shared semantic structure, (ii) a shared syntactic structure, (iii) a shared sentence structure, and (iv) a shared context.

13. The computer program product of claim 10, wherein the optimal weighted search query pattern is a weighted search query pattern determined to retrieve a highest number of relevant search results for a particular natural language search query.

14. The computer product method of claim 10, wherein the optimal weighted search query pattern is a weighted search query pattern determined answer a particular natural language query.

15. A computer system for optimizing search query results, comprising:
   one or more computer processors;
   a computer readable storage medium;
   computer program instructions;
   the computer program instructions being stored on the computer readable storage medium for execution by the one or more computer processors; and
   the computer program instructions including instructions to:
      receive a first natural language query;
      select a plurality of search query patterns based on the first natural language query;
      assign a weight to each search query pattern in the plurality of search query patterns;
      generate one or more first weighted keyword queries from each search query pattern based on the weight assigned to each search query pattern and one or more keywords from the first natural language query;
      evaluate a relevancy of one or more search results returned by each of the one or more first weighted keyword queries for the first natural language query, wherein the instructions to evaluate the relevancy of one or more search results comprises matching each of the one or more first keyword queries to a corpus of passages, wherein each passage in the corpus of passages is labeled as either correctly answering or not correctly answering a question from the first natural language query, and further wherein the instructions to evaluate the relevancy of one or more search results comprises scoring each passage in the corpus of passages labeled as correctly answering the question from the first natural language query and summing the scores of each of the one or more passages labeled as correctly answering the question from the first natural language query; and
      iteratively alter the weight assigned to a search query pattern in the plurality of search query patterns, based, at least in part on the summing of the scores of each of the one or more passages labeled as correctly answering the question from the first natural language query, until an optimal number of relevant search results are returned from the search query pattern for the first natural language query.

16. The computer system of claim 15, further comprising instructions to:
   receive a second natural language query;
   compare the second natural language query the first natural language query; and
   determine that the second natural language query matches the first natural language query.

17. The computer system of claim 16, further comprising instructions to, responsive to determining that the second natural language query matches the first natural language query:
   determine that the optimal weighted search query pattern is associated with the first natural language query;
   generate one or more second weighted keyword queries for the second natural language query based on the optimal weighted search query pattern associated with the first natural language query and one or more keywords from the second natural language query; and
   return one or more search results from the one or more second weighted keyword queries for the second natural language query.

18. The computer system of claim 16, further comprising instructions to, responsive to determining that the second natural language query does not match the first natural language query;
   generate one or more default weighted keyword queries for the second natural language query based a default weight assigned to a default search query pattern and one or more keywords from the second natural language query.

19. The computer system of claim 16, wherein a match between the second natural language query and the first natural language query is based on one or more of: (i) a shared semantic structure, (ii) a shared syntactic structure, (iii) a shared sentence structure, and (iv) a shared context.

20. The computer system of claim 17, wherein an optimal weighted search query pattern is the weighted search query pattern determined by at least one of: (i) to retrieve a highest number of relevant search results for a particular natural language search query, or (ii) to most accurately answer a particular natural language query.

* * * * *